Patented Feb. 9, 1954

2,668,776

UNITED STATES PATENT OFFICE 2,668,776

TITANIUM DIOXIDE PIGMENT AND METHOD OF PREPARING

Neville F. Miller, Palmerton, Pa., assignor to The New Jersey Zinc Company, New York, N. Y., a corporation of New Jersey No Drawing. Application March 18, 1950, Serial No. 150,563

6 Claims. (Cl. 106—300)

This invention relates to titanium dioxide pigments and embraces a novel method for improving the drying rate and stability of titanium dioxide pigments as well as the improved pigment produced thereby.

It is conventional practice in the art relating to titanium dioxide pigments to ascribe to the pigments certain qualities relating to their drying rate and stability in a paint film although the pigments themselves do not exhibit these qualities until they are incorporated in a paint or enamel vehicle. The drying rate is determined by the time required for a uniform film of the paint or enamel to become non-tacky, and the stability of the pigment in the film is determined by measurement of such properties as its resistance to chalking and its tint retention.

It is well known that the aforementioned quality characteristics of a titanium dioxide pigment can be enhanced by proper technique in the production of the pigment and that these properties can be further enhanced by certain "after-treatments" involving treatment of the processed pigment. Most of the titanium dioxide pigments presently marketed for use in paints and enamels appear to have been given an after-treatment in which either aluminum silicate, aluminum hydrate or alumina is incorporated in the pigment. After-treatments with numerous other compounds have been described in the prior art, including treatments relating to phosphates. For example, the United States patent to McKinney No. 2,378,148 describes a procedure for rendering inactive the phosphate impurities frequently present in titanium dioxide pigments. In accordance with the process of the patent, the phosphate content of a previously calcined titanium dioxide pigment, undoubtedly present in the form of pyrophosphate or metaphosphate as a result of the calcination, is rendered inactive by first adding aluminum sulfate to a defluocculated suspension of the pigment and subsequently neutralizing the treated suspension with an alkaline earth metal compound such as barium hydrate. At the other extreme, the United States patent to Patterson No. 2,187,050 recommends the incorporation in a titanium pigment slurry of a separately precipitated and prepared insoluble compound of aluminum such as aluminum phosphate.

I have now found that a combination of increased drying rate and stability materially exceeding those imparted to a titanium dioxide pigment by the aforesaid after-treatments can be provided by effecting precipitation of an aluminum orthophosphate product in situ in and throughout a dispersion of a titanium dioxide pigment. The pronounced effectiveness of the aluminum orthophosphate product in accordance with my invention appears to be the result of actually precipitating this product throughout the pigment rather than simply effecting a physical admixture of aluminum phosphate with the pigment. It is my present belief that the precipitation of an aluminum orthophosphate product throughout a dispersed titanium dioxide pigment pursuant to the invention results in the coating of the pigment particles with the aluminum orthophosphate product and that this intimate association is largely responsible for the outstanding properties of the resulting pigment.

The method of effecting the aforesaid improvement in a titanium dioxide pigment in accordance with my invention comprises suspending the pigment in an aqueous medium, effecting dispersion of the pigment in said medium by adding an alkali metal orthophosphate thereto, subsequently precipitating a dispersion of an aluminum orthophosphate product in situ throughout the dispersed pigment by adding a water-soluble aluminum salt thereto, and separating the resulting aluminum orthophosphate-containing pigment from the aqueous medium. The amounts of alkali metal orthophosphate and aluminum salt added to the pigment dispersion pursuant to my method should be such as to introduce into the pigment between 1% and 3.5% by weight on an anhydrous basis of an aluminum orthophosphate product composed of alumina and phosphoric pentoxide in which the molar ratio of alumina to phosphoric pentoxide is at least 1:1. The improved titanium dioxide pigment produced in accordance with this method comprises particles of titanium dioxide having dispersed therein between 1% and 3.5% by weight of an aluminum orthophosphate product composed of alumina and phosphoric pentoxide in which the molar ratio of alumina to phosphoric pentoxide is at least 1:1.

The order in which the alkali metal orthophosphate and water-soluble aluminum salt are added to the pigment dispersion appears to be essential for the attainment of the improved pigment qualities characteristic of my invention. Thus, when the aluminum salt is first added to the titanium dioxide pigment dispersion and the alkali metal orthophosphate is subsequently added to the suspension to precipitate the aluminum orthophosphate product, the resulting pigment shows no significant improvement in chalk resistance and tint retention properties and actually exhibits poorer drying, gloss retention and haze resistance properties than the untreated pigment. When these two reagents are added to the pigment suspension in accordance with the method of my invention, the soluble orthophosphate serves to disperse the titanium dioxide pigment and makes possible an intimate dispersion therein of the precipitated aluminum orthophosphate product when the aluminum salt is subsequently added to the suspension.

As a result of extensive investigation, I have ascertained that the improvement obtained by the use of aluminum orthophosphate in accordance with the invention cannot even be approximated by any phosphate carried over into the finished pigment from the raw titaniferous source material regardless of the amount of such naturally-occurring phosphate which may be present in the pigment. Such naturally occurring phosphate appears to be present in the pigment in the form of titanium phosphate or pyrophosphates or metaphosphates of other bases, or mixtures thereof. Titanium phosphate is insoluble in water and is not available for reaction with aluminum salt to form aluminum phosphate, and any pyrophosphate or metaphosphate available for reaction with the aluminum salt will produce either aluminum pyrophosphate or aluminum metaphosphate both of which are substantially ineffective for improving the aforementioned characteristics of a titanium dioxide pigment. I have also found that aluminum pyrophosphate and aluminum metaphosphate deliberately introduced from an extraneous source, as by the precipitation or dispersion of such phosphates in a titanium dioxide pigment suspension, are similarly ineffective. Accordingly, the phosphate precipitated in the dispersed titanium dioxide pigment suspension in accordance with my invention must be an orthophosphate.

The orthophosphate used in the practice of my invention should be a compound of suitable water-solubility such as the various orthophosphates of the alkali metals, and may be added as the salt itself or in the form of an aqueous solution thereof. Of the alkali metal orthophosphates, sodium orthophosphate is preferred because of its availability and ready solubility in water, and for this reason the following discussion of the invention will be confined to sodium orthophosphate as representative of such an alkali metal orthophosphate. The sodium orthophosphate can be used in the form of the mono-, di- or tribasic orthophosphate. Of these forms, the dibasic and tribasic orthophosphates are preferred because of their outstanding effectiveness as dispersing agents for the titanium dioxide pigment suspended in an aqueous medium prior to the addition thereto of the aluminum salt.

The water-soluble aluminum salt, in addition to its role as a source of aluminum for the precipitation of aluminum orthophosphate, functions as a coagulant for the titanium dioxide pigment dispersion. Although aluminum chloride, aluminum nitrate and aluminum acetate may be used satisfactorily, aluminum sulfate is preferred as the source of aluminum because of its availability and relatively low cost. It will be understood, however, that the subsequent reference herein solely to aluminum sulfate is in the interest of clarity and must not be interpreted as a limitation of the scope of the invention. The aluminum salt may be added as such to the pigment dispersion or it may be added with particular advantage in the form of an aqueous solution thereof.

The amount of aluminum sulfate added to the pigment suspension dispersed by the addition thereto of sodium orthophosphate should be such with respect to the amount of sodium orthophosphate used as to precipitate in the suspension an aluminum orthophosphate product in which the molar ratio of aluminum to phosphate is at least 1:1. The formulas for all normal aluminum phosphates can be written in terms of varying amounts of alumina and phosphoric pentoxide. In the aluminum orthophosphate products precipitated in situ in a titanium dioxide pigment dispersion in accordance with the present invention, the molar ratio of alumina to phosphoric pentoxide is at least 1:1 with any excess alumina above this equimolar proportion apparently being present as uncombined or free alumina produced by hydrolysis of the aluminum sulfate. The amount of excess alumina may vary considerably, and an actual excess of alumina is generally preferred up to amounts corresponding to 6 mols of alumina to 1 mol of phosphoric pentoxide in the precipitated aluminum orthophosphate product. Increasing amounts of excess alumina between equimolar proportions and a ratio of about 3:1 appear to produce increasing improvement in the paint drying properties of the resulting pigment as well as increasing chalk resistance, tinting strength, hiding power and fading resistance. Aluminum orthophosphate products having an alumina to phosphoric pentoxide ratio between about 3:1 and 6:1 appear to exhibit substantially uniform high drying rate and tint retention. At alumina to phosphoric pentoxide ratios above about 6:1 and up to about 12:1 there appears to be some progressive lowering of chalk resistance and tint retention although these qualities remain superior throughout this range to the qualities produced by other after-treatments referred to hereinbefore. Where the amount of the aluminum orthophosphate product precipitated on the dispersed pigment does not exceed about 2% by weight, alumina to phosphoric pentoxide ratios ranging from about 6:1 to about 12:1 yield pigments having somewhat lower oil absorption and less tendency to form hard settled cakes of the pigment upon aging of paints containing these treated pigments than is the case when this ratio is about 3:1. Thus, alumina to phosphoric pentoxide molar ratios from 1:1 to 12:1 lead to improved pigment qualities although molar ratios within the range of about 3:1 to 6:1 are preferred in most instances because of their particular effectiveness in improving the stability of titanium dioxide pigments.

The amount of aluminum orthophosphate product dispersed throughout the titanium dioxide pigment pursuant to my invention should range between 1% and 3.5% by weight of the pigment. Amounts below 1% show noticeably less effectiveness in improving the pigment qualities, and amounts in excess of 3.5% produce a noticeable loss in the hiding power of the pigment. It will be understood, of course, that the specified range of useful amounts is used herein and in the claims in the sense that includes any free alumina present as a component part of the aluminum orthophosphate product dispersed throughout the pigment pursuant to the invention. For example, the lower limit of 1% of this product embraces not only an aluminum orthophosphate product composed substantially exclusively of aluminum orthophosphate but also products in which the alumina to phosphoric pentoxide ratios extend up to say 6:1 (i. e., 2½ mols of free alumina to 1 mol of aluminum orthophosphate). Thus, I have found that a minimum of about 1% of an aluminum orthophosphate product is effective whether the alumina to phosphoric pentoxide ratio is as low as 1:1 or as high as 6:1. Any alumina precipitated with the aluminum orthophosphate in the practice of the invention appears to function synergistically with the aluminum orthophosphate and exhibits the behavior characteristic of the aluminum orthophosphate rather than the behavior characteristic of alumina alone. Substantially the same considerations apply to the upper limit of 3.5% by weight of the aluminum orthophosphate product dispersed throughout a titanium dioxide pigment pursuant to the invention except that at this upper limit molar ratios of alumina to phosphoric pentoxide as high as 12:1 will yield pigments exhibiting better stability in a paint film than a similar pigment treated with alumina alone by a procedure similar to that of the invention.

The procedure for effecting dispersion of the aluminum orthophosphate product throughout a titanium dioxide pigment in accordance with the invention comprises, as pointed out hereinbefore, the steps of suspending the pigment in an aqueous medium such as water, then adding the sodium orthophosphate, subsequently adding the aluminum sulfate, and finally separating the aluminum orthophosphate-containing pigment from the aqueous medium by filtration or the like. In order to secure rapid settling and filtering of the pigment from the suspension thereof to which the soluble orthophosphate and aluminum sulfate have been added, it is advantageous to neutralize the pigment suspension containing the aluminum orthophosphate product. The pigment appears to exhibit some preferential adsorption of the alkali component of the aqueous medium with the result that the medium becomes somewhat acidic. Although a slightly acidic pH in the aqueous medium containing the treated pigment is not inconsistent with the attainment of improved pigment properties, fastest settling and filtering rates are obtained when the aqueous medium is exactly neutral (i. e. at a pH of 7.0). As the treated pigment suspension is neutralized there is a tendency for the pigment to adsorb a small amount of alkali (or to desorb a small amount of acid), and consequently it has been found to be advantageous in neutralizing the suspension with ammonium hydroxide or sodium hydroxide solution to carry the pH of the aqueous medium over onto the alkaline side, that is, to a pH of about 7.2. By the time the pigment is filtered it will be found that the filtrate will have a pH of 7.0. It will be appreciated that the neutralization of the treated pigment suspension further insures complete precipitation as alumina of any unhydrolyzed portion of the aluminum sulfate added in excess of that required for reaction with the sodium orthophosphate.

I have also found that settling and filtration of the treated pigment suspension is facilitated by heating the suspension after neutralization. Although such heating of the neutralized suspension appears to have no effect upon the properties of the pigment which are improved by the dispersion therein of the aluminum orthophosphate product, I prefer to utilize this heating step in the practice of my invention. For this purpose, heating the treated pigment suspension to about 60°–80° C. results in maximum settling and filtering rates. Following filtration, it has been found advantageous to repulp the pigment to permit blending of a plurality of batches of treated pigments and thereby achieve continuous production of a treated pigment having substantially uniform properties. However, the repulping step may be omitted without in any way detracting from the improved properties of the pigment obtained in accordance with the invention.

The following examples are believed to be sufficiently illustrative of the method of producing the improved titanium dioxide pigment in accordance with the invention:

Example I

In order to produce a titanium dioxide pigment containing 2.26% of an aluminum orthophosphate product having a theoretical molar ratio of alumina to phosphate of about 3:1, one liter of a slurry containing 300 grams of rutile titanium dioxide pigment was well stirred and to this slurry there was slowly added a solution comprising 11.50 grams of trisodium orthophosphate ($Na_3PO_4.12H_2O$) dissolved in 150 cc. of water. Stirring was continued for 15 minutes, whereupon there was slowly added to the slurry a solution comprising 30.25 grams of aluminum sulfate [$Al_2(SO_4)_3.18H_2O$] dissolved in 200 cc. of water. After further stirring for about 5 minutes, the pH of the slurry was raised to 7.2 by the slow addition thereto of about 79–80 cc. of 10% sodium hydroxide solution. The slurry was then heated to 60° C. and was maintained at this temperature for 1 hour with continuous stirring. The pigment was subsequently filtered and washed with about 1800 cc. of water, following which the pigment filter cake was repulped in 1000 cc. of water, allowed to stand overnight, and then filtered. The treated pigment comprising the filter cake was finally dried in an oven at a temperature of about 105° C.

The same procedure was applied to the same amount of anatase titanium dioxide pigment and resulted in a pigment having substantially the same degree of improvement in drying time and stability as the treated rutile pigment.

Example II

In order to produce a titanium dioxide pigment containing 2.5% of an aluminum orthophosphate product having a theoretical molar ratio of alumina to phosphoric pentoxide of 1:1, a liter of a slurry containing 300 grams of rutile titanium dioxide pigment was thoroughly stirred and there was slowly added thereto a solution comprising 23.36 grams of trisodium orthophosphate ($Na_3PO_4.12H_2O$) dissolved in 150 cc. of water. Stirring was continued for 15 minutes, following which there was slowly added to the slurry a solution comprising 20.50 grams of aluminum sulfate [$Al_2(SO_4)_3.18H_2O$] dissolved in 100 cc. of water. After continuing the stirring for an additional 15 minutes, the pH of the slurry was raised to 7.2 by the slow addition thereto of about 13.0 cc. of a 10% sodium hydroxide solution. The slurry was then heated to 60° C. and was maintained at this temperature with constant stirring for a period of 1 hour. The pigment slurry was subsequently filtered and washed with 1800 cc. of water, following which the pigment filter cake was repulped in 1000 cc. of water, allowed to stand overnight, then filtered and dried at a temperature of 105° C.

The same treatment applied to the same quantity of anatase titanium dioxide pigment produced substantially the same degree of improvement in the drying rate and stability of the treated pigment as that obtained by treatment of the rutile pigment.

Although the specified amounts of the reagents were used in each of the foregoing examples, it was found by chemical analysis that the actual composition of the precipitated product differed somewhat in each instance from theoretical composition which was expected in that it was deficient in phosphoric pentoxide. Thus, the product obtained as described in Example I, which was theoretically expected to have an alumina to phosphoric pentoxide ratio of 3:1, was found by chemical analysis to have a molar ratio of 3.56:1. Similarly, the product obtained as described in Example II, which was intended to correspond to the formula $AlPO_4$ in which the molar ratio of alumina to phosphoric pentoxide is 1:1, was found by chemical analysis to have a molar ratio of 1.40:1. The products obtained by both procedures were found to further contain amounts of "bound water" ranging from about 15% to about 25% by weight of the pigment. This "bound water" was not appreciably removed by prolonged drying at 105° C. but was readily removed by ignition of the treated pigments at red heat. X-ray examination of aluminum orthophosphate precipitates produced in exactly the same manner except for the absence of the titanium dioxide pigment that the crystal pattern and thus indicated that the precipitated product was essentially amorphous in structure and colloidal in size.

An evaluation of the improvements in physical properties exhibited by the pigments produced in accordance with the invention was obtained by incorporating each pigment tested in an exterior house paint formula for comparison of the chalk resistance and tint retention of the pigments and in an alkyd resin enamel for comparison of other pigment qualities. A comparison between the drying rate, chalk resistance and tint retention of a treated pigment of the present invention and these same properties of the untreated base pigment (a substantially phosphorus-free rutile pigment produced from Allard lake ilmenite), the base pigment treated with aluminum silicate and the base pigment treated with aluminum pyrophosphate is offered by the following table. The aluminum silicate-treated pigment was obtained by first adding sodium metasilicate to a slightly alkaline (pH 7.4) pigment slurry and then adding aluminum sulfate thereto. The aluminum pyrophosphate-treated pigment was obtained by substituting sodium pyrophosphate for the sodium orthophosphate in the procedure described in conjunction with the practice of the invention. This last pigment was prepared to represent a pigment in which a naturally-occurring pyrophosphate was used as the source of phosphate for precipitation of an aluminum phosphate.

| Specimen | Treatment | Drying Time, Hours | Chalking [1] After 30 Days' Exposure | Tint Retention [2] After 30 Days' Exposure |
| --- | --- | --- | --- | --- |
| A | Control, no treatment | 5.5 | 7 | 12.4 |
| B | Aluminum Silicate [1.33% $Al_2O_3$+1.19% $SiO_2$] | 4.5 | 4 | 8.3 |
| C | Aluminum Pyrophosphate [0.24% $Al_4(P_2O_7)_3$+0.13% $Al_2O_3$] | 8 | 7 | 10.8 |
| D | Aluminum Orthophosphate [1.33% $Al_2O_3$+0.93 $P_2O_5$] | 4 | 0 | 1.1 |

[1] Key: 0=none; 1=very slight; 2, 3, 4=slight; 5, 6, 7=moderate; 8, 9=bad; 10=very bad.
[2] The lower the value the less the fading.

The results compiled in the foregoing table are indicative of the superiority of the pigments of the invention over those prepared according to the most pertinent prior art of which I am aware. Inasmuch as these results were obtained under accelerated test conditions, relatively small differences in test results are indicative of very substantial differences under normal usage conditions. The pigments of the invention similarly excel the prior art products in gloss retention and in resistance to hazing, afteryellowing and yellowing during baking. The superior qualities imparted to rutile titanium dioxide pigments by the treating procedure of the invention are similarly imparted to anatase pigments, and for this reason the expression "titanium dioxide pigment" is used herein and in the claims as a term generic to both types of pigment particle structure.

I claim:

1. The method of improving the drying rate and stability of a titanium dioxide pigment which comprises suspending the pigment in a aqueous medium, effecting dispersion of the pigment in said medium by adding an alkali metal orthophosphate thereto, subsequently precipitating a dispersion of an aluminum orthophosphate product throughout the dispersed pigment by adding a water-soluble aluminum salt thereto, the amounts of the alkali metal orthophosphate and aluminum salt added to the pigment suspension being such as to precipitate therein between 1% and 3.5% by weight of said aluminum orthophosphate product in which the molar ratio of alumina to phosphoric pentoxide is at least 1:1, and separating the resulting aluminum orthophosphate-containing pigment from the aqueous medium.

2. The method of improving the drying rate and stability of a titanium dioxide pigment which comprises suspending the pigment in an aqueous medium, effecting dispersion of the pigment in said medium by adding sodium orthophosphate thereto, subsequently precipitating a dispersion of an aluminum orthophosphate product throughout the dispersed pigment by adding aluminum sulfate thereto, the amounts of sodium orthophosphate and aluminum sulfate added to the pigment suspension being such as to precipitate therein between 1% and 3.5% by weight of said aluminum orthophosphate product in which the molar ratio of alumina to phosphoric pentoxide is at least 1:1, and separating the resulting aluminum orthophosphate-containing pigment from the aqueous medium.

3. The method of improving the drying rate and stability of a titanium dioxide pigment which comprises suspending the pigment in an aqueous medium, effecting dispersion of the pigment in said medium by adding sodium orthophosphate thereto, subsequently precipitating a dispersion of an aluminum orthophosphate product throughout the dispersed pigment by adding aluminum sulfate thereto, the amounts of sodium orthophosphate and aluminum sulfate added to the pigment suspension being such as to precipitate therein between 1% and 3.5% by weight of said aluminum orthophosphate product in which the molar ratio of alumina to phosphoric pentoxide ranges from 3:1 to about 6:1, and separating the resulting aluminum orthophosphate-containing pigment from the aqueous medium.

4. The method of improving the drying rate and stability of a titanium dioxide pigment which comprises suspending the pigment in an aqueous medium, effecting dispersion of the pigment in said medium by adding trisodium orthophosphate thereto, subsequently precipitating a dispersion of an aluminum orthophosphate product throughout the dispersed pigment by adding aluminum sulfate thereto, the amounts of trisodium orthophosphate and aluminum sulfate added to the pigment suspension being such as to precipitate therein between 1% and 3.5% by weight of said aluminum orthophosphate product in which the molar ratio of alumina to phosphoric pentoxide is at least 1:1, and separating the resulting aluminum orthophosphate-containing pigment from the aqueous medium.

5. The product obtained by the method of claim 1.

6. The product obtained by the method of claim 3.

NEVILLE F. MILLER.

References Cited in the file of this patent

UNITED STATES PATENTS

| Number | Name | Date |
| --- | --- | --- |
| 2,187,050 | Patterson | Jan. 16, 1940 |
| 2,378,790 | Robertson | June 19, 1945 |